(12) United States Patent
Li et al.

(10) Patent No.: US 12,200,712 B2
(45) Date of Patent: Jan. 14, 2025

(54) METHOD, DEVICE AND SYSTEM FOR INDICATING AND OBTAINING NUMBER OF PUCCH REPETITIONS

(71) Applicant: CHINA TELECOM CORPORATION LIMITED, Beijing (CN)

(72) Inventors: Nanxi Li, Beijing (CN); Jianchi Zhu, Beijing (CN); Jing Guo, Beijing (CN); Hang Yin, Beijing (CN); Xiaoming She, Beijing (CN); Peng Chen, Beijing (CN)

(73) Assignee: CHINA TELECOM CORPORATION LIMITED, Beijing (CN)

( * ) Notice: Subject to any disclaimer, the term of this patent is extended or adjusted under 35 U.S.C. 154(b) by 0 days.

(21) Appl. No.: 18/271,361

(22) PCT Filed: Jul. 29, 2021

(86) PCT No.: PCT/CN2021/109135
§ 371 (c)(1),
(2) Date: Jul. 7, 2023

(87) PCT Pub. No.: WO2022/148011
PCT Pub. Date: Jul. 14, 2022

(65) Prior Publication Data
US 2024/0064744 A1    Feb. 22, 2024

(30) Foreign Application Priority Data

Jan. 8, 2021 (CN) .......................... 202110023352.9

(51) Int. Cl.
*H04W 72/21* (2023.01)
*H04W 72/232* (2023.01)

(52) U.S. Cl.
CPC ......... *H04W 72/21* (2023.01); *H04W 72/232* (2023.01)

(58) Field of Classification Search
CPC ... H04L 5/0053; H04L 5/0055; H04L 5/0057; H04W 72/10; H04W 72/1242; H04W 72/1247; H04W 72/0875
See application file for complete search history.

(56) References Cited

U.S. PATENT DOCUMENTS

2020/0205150 A1    6/2020   Cheng et al.
2020/0259625 A1    8/2020   Papasakellariou

FOREIGN PATENT DOCUMENTS

CN    109769305 A    5/2019
CN    110324896 A    10/2019

(Continued)

OTHER PUBLICATIONS

International Search Report and Written Opinion issued on Oct. 21, 2021 in corresponding Application No. PCT/CN2021/109135; 12 pages.

(Continued)

*Primary Examiner* — Bo Hui A Zhu
(74) *Attorney, Agent, or Firm* — Andrew M. Calderon; Calderon Safran & Wright P.C.

(57) ABSTRACT

The present disclosure relates to a method, device and system for indicating and obtaining a number of PUCCH repetitions. The method includes: configuring a plurality of physical uplink control channel (PUCCH) resources for a user equipment (UE) through radio resource control signaling; determining a number of repetitions corresponding to each PUCCH resource of the plurality of PUCCH resources by using a predefined rule; determining a current number of repetitions of a PUCCH transmission by the UE; determining a current resource index number of a resource for the PUCCH transmission by the UE corresponding to the current number of repetitions; and sending the current resource index number to the UE, to indicate the current number of repetitions, so that UE decodes the received current resource index number and determines the current number of repetitions.

20 Claims, 5 Drawing Sheets

(56) References Cited

FOREIGN PATENT DOCUMENTS

| CN | 110365451 | A  | 10/2019 |
|----|-----------|----|---------|
| CN | 110536450 | A  | 12/2019 |
| CN | 111092695 | A  | 5/2020  |
| EP | 3661299   | A1 | 8/2010  |
| WO | 2019135597 | A1 | 7/2019 |
| WO | 2019194655 | A1 | 10/2019 |
| WO | 2021143111 | A1 | 7/2021 |

OTHER PUBLICATIONS

R1-2007681—3GPP TSG-RAN WG1 #103-e "Discussion on Solutions for PUCCH coverage enhancement" Nov. 2, 2020; e-Meeting, Oct. 26-Nov. 13, 2020; 11 pages.
Office Action issued in corresponding Chinese Patent Application No. 202110023352.9 on Jul. 6, 2023; 23 pages.
International Search Report and Written Opinion issued on Oct. 21, 2021 in corresponding Application No. PCT/CN2021/109135.
Japanese Office Action dated Jun. 28, 2024 in Japanese Application No. 2023-541649, with English Translation, 5 pages.
Vivo, "Discussion on Solutions for PUCCH coverage enhancement", 3GPP TSG-RAN WG1 #103-e R1-209648, e-Meeting, Oct. 26-Nov. 13, 2020, 13 Pages.
The Extended European Search Report and Opinion dated Jun. 11, 2024 in EP Application No. 21917054.5-1206 / 4277185 PCT/CN2021109135 11 pages.

METHOD, DEVICE AND SYSTEM FOR INDICATING AND OBTAINING NUMBER OF PUCCH REPETITIONS

CROSS-REFERENCE TO RELATED APPLICATIONS

The present disclosure is a U.S. National Stage Application under 35 U.S.C. § 371 of International Patent Application No. PCT/CN2021/109135, filed on Jul. 29, 2021, which is based on and claims priority of Chinese application for invention No. 202110023352.9, filed on Jan. 8, 2021, the disclosure of both of which are hereby incorporated into this disclosure by reference in its entirety.

TECHNICAL FIELD

The present disclosure relates to the field of wireless communication, in particular to a method, device and system for indicating and obtaining a number of PUCCH repetitions.

BACKGROUND

PUCCH (Physical Uplink Control Channel) is mainly used to carry uplink control information, comprising CSI (Channel State Information), SR (Scheduling Request) and HARQ-ACK (Hybrid Automatic Repeat request-Acknowledgement), wherein, PUCCH resources of the CSI and SR use a RRC (Radio Resource Control) signaling semi-persistent configuration, PUCCH resources of the HARQ-ACK use a RRC signaling semi-persistent configuration, and used PUCCH resources are determined by DCI (Downlink Control Information) indication.

According to the current NR (New Radio) protocol version, after the user equipment (UE) and the base station establish a RRC connection, the base station may configure several PUCCH resource sets for the UE through the RRC signaling, each PUCCH resource set may also configure several PUCCH resources, and each PUCCH resource corresponds to a PUCCH format, wherein, PUCCH formats 1, 3 and 4 support repetition, and repetition numbers are configured by the RRC signaling respectively. When the number of PUCCH repetitions is configured to be n, the UE will repeatedly send PUCCH carrying UCI (Uplink Control Information) in n consecutive time slots. At this time, the number of consecutive symbols and the start symbol position of each repeated PUCCH are the same.

SUMMARY

According to one aspect of the present disclosure, a method for indicating a number of PUCCH repetitions. The method comprises the steps of: configuring a plurality of physical uplink control channel (PUCCH) resources for a user equipment (UE) through radio resource control signaling; determining a number of repetitions corresponding to each PUCCH resource of the plurality of PUCCH resources by using a predefined rule; determining a current number of repetitions of a PUCCH transmission by the UE; determining a current resource index number of a resource for the PUCCH transmission by the UE corresponding to the current number of repetitions; and sending the current resource index number to the UE, to indicate the current number of repetitions, so that UE decodes the received current resource index number and determines the current number of repetitions.

In some embodiments of the present disclosure, the step of sending the resource index number to UE comprises: sending the current resource index number to UE through a PUCCH resource indicator of downlink control information.

In some embodiments of the present disclosure, the step of determining a number of repetitions corresponding to each PUCCH resource of the plurality of PUCCH resources by using a predefined rule comprises: classifying all the PUCCH resources according to PUCCH formats; and determining the number of repetitions corresponding to each PUCCH resource in each classification.

In some embodiments of the present disclosure, the determining a number of repetitions corresponding to each PUCCH resource comprises: determining a repetition parameter corresponding to each PUCCH resource; and determining the number of repetitions corresponding to each repetition parameter.

In some embodiments of the present disclosure, the step of determining a repetition parameter corresponding to each PUCCH resource comprises: setting a serial number of each repetition parameter in a repetition parameter set of PUCCH; sorting all PUCCH resource index numbers in each classification; determining a serial number of a repetition parameter corresponding to a serial number of each PUCCH resource index number; and taking the repetition parameter of the serial number as a repetition parameter corresponding to the resource index number.

In some embodiments of the present disclosure, the step of determining a serial number of a repetition parameter corresponding to a serial number of each PUCCH resource index number comprises: performing a remainder operation on the serial number of each PUCCH resource index number and a sum of elements of a repetition parameter set; determining the serial number of the repetition parameter according to the remainder in a case where the remainder is not zero; and determining the serial number of the repetition parameter according to the sum of the elements of the repetition parameter set in a case where the remainder is zero.

In some embodiments of the present disclosure, the repetition parameter set is a predefined repetition number set; and the step of determining a number of repetitions corresponding to each repetition parameter comprises: taking each repetition parameter in the repetition parameter set as the number of repetitions.

In some embodiments of the present disclosure, the determining a number of repetitions corresponding to each repetition parameter comprises: configuring number of repetitions of a PUCCH resource in each PUCCH format; and setting each repetition parameter in the repetition parameter set as an offset value relative to the repetition number of a format of the PUCCH within a predefined repetition number set.

According to another aspect of the present disclosure, a method for obtaining a number of PUCCH repetitions is provided. The method comprises the steps of: receiving resource configuration information of a plurality of physical uplink control channel (PUCCH) resources configured for a user equipment (UE) by a base station through radio resource control signaling; receiving a current resource index number of a resource used by the UE for PUCCH transmission sent by the base station; and decoding the received current resource index number by using a predefined rule to obtain a corresponding current number of repetitions.

In some embodiments of the present disclosure, the step of decoding the received current resource index number by using a predefined rule to obtain a corresponding current number of repetitions comprises: determining a corresponding repetition parameter according to the received current resource index number; and determining a corresponding current number of repetitions according to the determined repetition parameter.

In some embodiments of the present disclosure, the step of determining a corresponding repetition parameter according to the received current resource index number comprises: determining a serial number of the received current resource index number among all the PUCCH resource index numbers in a PUCCH format; setting a serial number of each repetition parameter in a repetition parameter set of PUCCH; determining a serial number of a repetition parameter corresponding to a serial number of the current resource index number; and taking a repetition parameter of the serial number as a repetition parameter corresponding to the current resource index number.

In some embodiments of the present disclosure, the step of determining a serial number of a repetition parameter corresponding to a serial number of the current resource index number comprises: performing a remainder operation on the serial number of a current resource index number and a sum of elements of a repetition parameter set repetition parameter set; determining the serial number of the corresponding repetition parameter according to the remainder in a case where the remainder is not zero; and determining the serial number of the corresponding repetition parameter according to a sum of elements of the repetition parameter set in a case where the remainder is zero.

In some embodiments of the present disclosure, the step of determining a corresponding current number of repetitions according to the determined repetition parameter comprises: taking the determined repetition parameter as a corresponding current number of repetitions in a case where the repetition parameter set is a predefined repetition number set.

In some embodiments of the present disclosure, the step of determining a corresponding current number of repetitions according to the determined repetition parameter comprises: determining a corresponding current number of repetitions according to the determined repetition parameter, a number of repetitions of a PUCCH resource in a PUCCH format and the predefined repetition number set in a case where each repetition parameter in the repetition parameter set is an offset value relative to the repetition number of a format of the PUCCH within a predefined repetition number set.

According to another aspect of the present disclosure, a base station is provided. The base station comprises: a resource configuring module configured to configure a plurality of physical uplink control channel (PUCCH) resources for a user equipment (UE) through radio resource control signaling; a correspondence relationship determining module configured to determine a number of repetitions corresponding to each PUCCH resource of the plurality of PUCCH resources by using a predefined rule; a repetition number determining module configured to determine a current number of repetitions of a PUCCH transmission by the UE; a resource index number determining module configured to determine a current resource index number of a resource for the PUCCH transmission by the UE corresponding to the current number of repetitions; and a repetition number indicating module configured to send the current resource index number to the UE, to indicate the current number of repetitions, so that UE decodes the received current resource index number and determines the current number of repetitions, wherein the base station is configured to perform operations for implementing the method according to any one of the above-described embodiments.

According to another aspect of the present disclosure, a user equipment is provided. The user equipment comprises: a resource configuration receiving module configured to receive resource configuration information of a plurality of physical uplink control channel (PUCCH) resources configured for a user equipment (UE) by a base station through radio resource control signaling; a resource index number receiving module configured to receive a current resource index number of a resource used by the UE for PUCCH transmission sent by the base station; and a repetition number obtaining module configured to decode the received current resource index number by using a predefined rule to obtain a corresponding current number of repetitions, wherein the UE is configured to perform operations to implement the obtaining method according to any one of the above-described embodiments.

According to another aspect of the present disclosure, a system for indicating a number of PUCCH repetitions is provided. The system comprises a base station according to any one of the above-described embodiments and UE according to any one of the above-described embodiments.

According to another aspect of the present disclosure, a computer device is provided. The computer device comprises: a memory configured to store instructions; and a processor configured to execute the instructions, so that the computer device performs operations to implement the method for indicating a number of PUCCH repetitions according to any of the above-described embodiments, or the method for obtaining a number of PUCCH repetitions according to any of the above-described embodiments.

According to another aspect of the present disclosure, a non-transitory computer-readable storage medium is provided, wherein the non-transitory computer-readable storage medium stores computer instructions that, when executed by a processor, implement the method for indicating a number of PUCCH repetitions according to any of the above-described embodiments, or the method for obtaining a number of PUCCH repetitions according to any of the above-described embodiments.

BRIEF DESCRIPTION OF THE ACCOMPANYING DRAWINGS

In order to more explicitly explain the embodiments of the present disclosure or the technical solutions in the prior art, the accompanying drawings required to be used in the description of the embodiments or the prior art will be briefly introduced below. It is apparent that, the accompanying drawings illustrated below are merely some of the embodiments of the present disclosure. For those of ordinary skill in the art, other accompanying drawings may also be obtained according to these accompanying drawings on the premise that no inventive effort is involved.

DETAILED DESCRIPTION

The technical solution in the embodiments of the present disclosure will be explicitly and completely described below in conjunction with the accompanying drawings in the embodiments of the present disclosure. Apparently, the embodiments described are merely some of the embodiments of the present disclosure, rather than all of the embodiments. The following descriptions of at least one exemplary embodiment which are in fact merely illustrative, shall by no means serve as any delimitation on the present disclosure as well as its application or use. On the basis of the embodiments of the present disclosure, all the other embodiments obtained by those skilled in the art on the premise that no inventive effort is involved shall fall into the protection scope of the present disclosure.

Unless otherwise specified, the relative arrangements, numerical expressions and numerical values of the components and steps expounded in these examples shall not limit the scope of the present invention.

At the same time, it should be understood that, for ease of description, the dimensions of various parts shown in the accompanying drawings are not drawn according to actual proportional relations.

The techniques, methods, and apparatuses known to those of ordinary skill in the relevant art might not be discussed in detail. However, the techniques, methods, and apparatuses shall be considered as a part of the granted description where appropriate.

Among all the examples shown and discussed here, any specific value shall be construed as being merely exemplary, rather than as being restrictive. Thus, other examples in the exemplary embodiments may have different values.

It is to be noted that: similar reference signs and letters present similar items in the following accompanying drawings, and therefore, once an item is defined in one accompanying drawing, it is necessary to make further discussion on the same in the subsequent accompanying drawings.

The number of PUCCH repetitions in the related art may only use a RRC signaling semi-persistent configuration, but this method might waste resources on the one hand. For example, PUCCH has been correctly received after a certain repetition, but the UE will still continue to repeatedly transmit the PUCCH until the configured number of repetitions is reached. On the other hand, it is possible to affect the transmission of the PUSCH (Physical Uplink Shared Channel). When the PUCCH and the PUSCH overlap in the transmission resources, the PUSCH transmission will be abandoned, so that the redundant PUCCH transmission might adversely affect the transmission performance of PUSCH. Therefore, it is necessary to introduce a method for dynamically indicating a number of PUCCH repetitions, so that the base station may flexibly configure the PUCCH repetition, thereby improving the utilization efficiency and transmission performance of the uplink resource. In general, the dynamic indication method is realized by adding fields of the DCI. However, this method will increase the overhead of the DCI. Since the DCI is carried on the PDCCH (Physical Downlink Control Channel), the increased overhead of the DCI might affect the performance of the PDCCH.

In view of at least one of the above technical problems, the present disclosure provides a method, device and system for indicating and obtaining a number of PUCCH repetitions, which may allow that the base station may dynamically configure a number of PUCCH repetitions without increasing the overhead of the DCI.

Figure 1A:
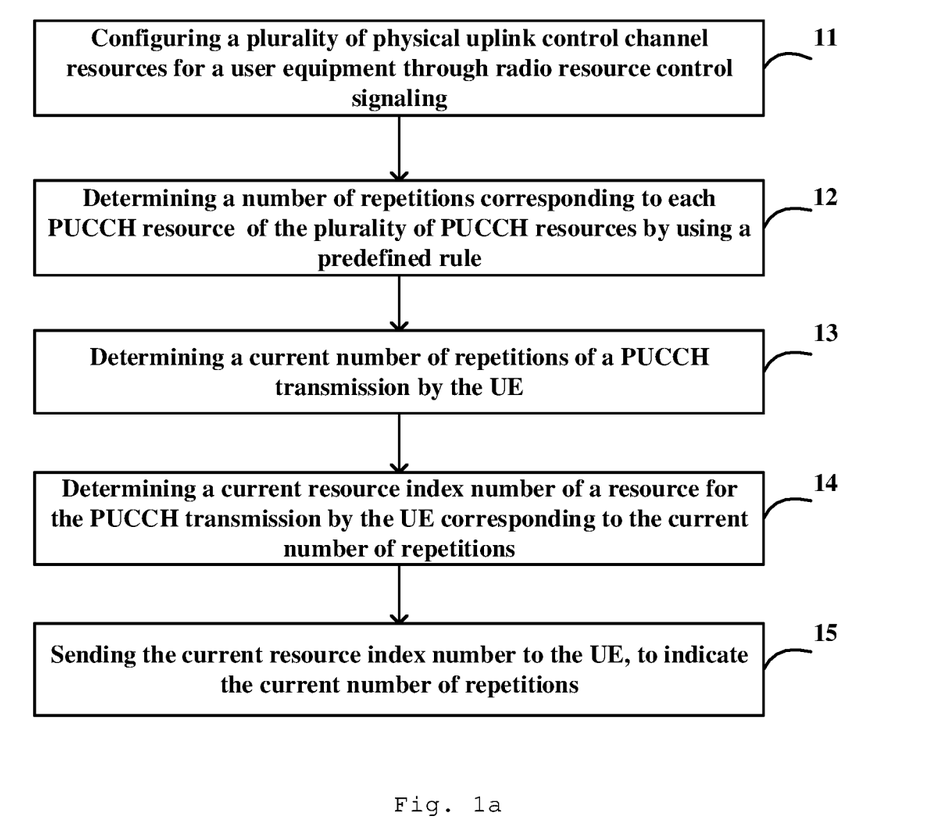
FIG. 1a is a schematic view of a method for indicating a number of PUCCH repetitions according to some embodiments of the present disclosure.

FIG. 1a is a schematic view of a method for indicating a number of PUCCH repetitions according to some embodiments of the present disclosure. Preferably, this embodiment may be performed by the base station of the present disclosure. The method according to the embodiment of FIG. 1 may comprise steps 11-15.

In Step 11, the base station configures a plurality of PUCCH resources for UE through the radio resource control signaling.

In Step 12, the base station determines a number of repetitions corresponding to each PUCCH resource of the plurality of PUCCH resources by using a predefined rule.

In Step 13, the base station determines a current number of repetitions for a PUCCH transmission by the UE.

In Step 14, the base station determines a current resource index number of a resource for PUCCH transmission by the UE corresponding to the current number of repetitions according to a correspondence relationship between a PUCCH resource index number and the number of repetitions.

In Step 15, the base station sends the current resource index number to the UE, to indicate the current number of repetitions, so that the UE decodes the received current resource index number and determines the current number of repetitions.

According to the present disclosure, it is possible to allow that the base station may dynamically configure the number of PUCCH repetitions without increasing the overhead of the DCI, thereby improving the utilization efficiency and transmission performance of the uplink resources.

Figure 1B:
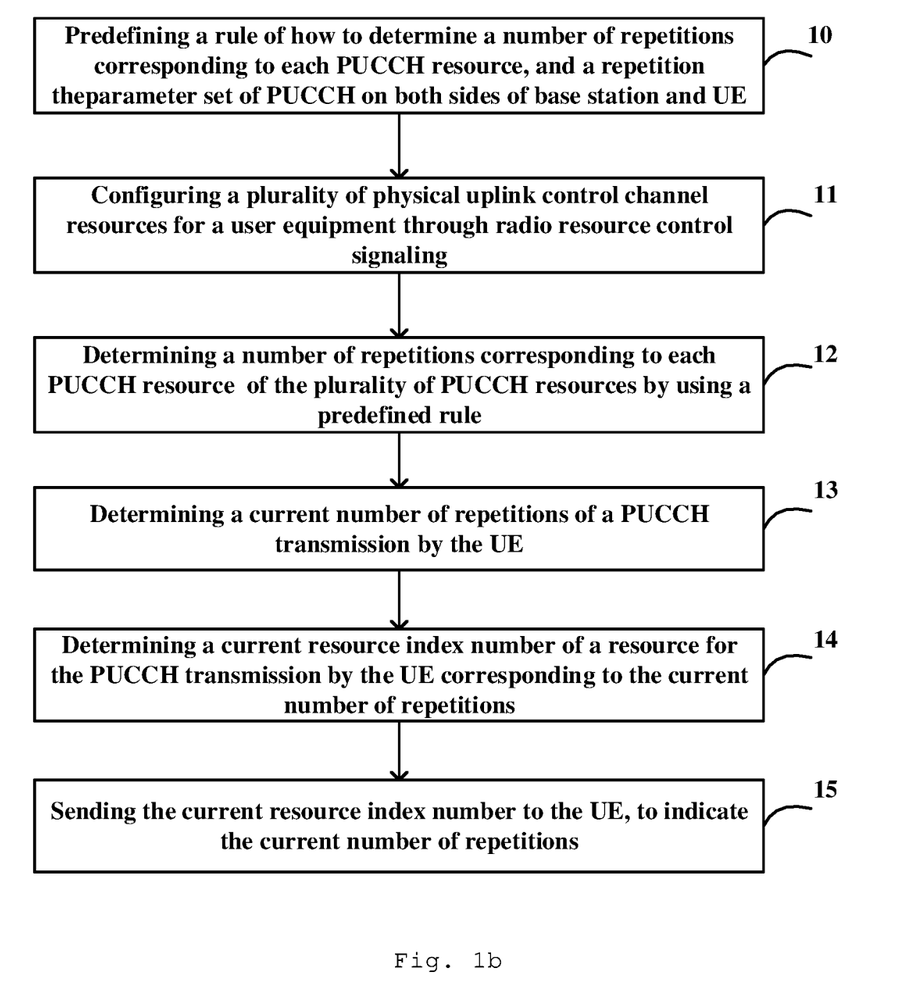
FIG. 1b is a schematic view of a method for indicating a number of PUCCH repetitions according to other embodiments of the present disclosure.

FIG. 1b is a schematic view of a method for indicating a number of PUCCH repetitions according to other embodiments of the present disclosure. Preferably, this embodiment may be performed by the base station of the present disclosure. The method according to the embodiment of FIG. 1 may comprise steps 10-15.

In Step 10, a rule of how to determine a number of repetitions corresponding to each PUCCH resource, and a repetition parameter set of PUCCH are predefined on both sides of the base station and the UE.

In some embodiments of the present disclosure, the step 10 may comprise steps 101 and 102.

In Step 101, a rule (algorithm) of how to determine a number of repetitions corresponding to each PUCCH resource is predefined by a protocol on both sides of the base station and the UE.

In Step 102, a repetition parameter set of PUCCH is predefined on both sides of the base station and the UE, and a serial number i of each repetition parameter in the repetition parameter set is set, wherein a sum of factors in the repetition parameter set is N, which presents that it is necessary to configure N types of repetition parameters of PUCCH, and each repetition parameter corresponds to a type of a number of repetitions.

In some embodiments of the present disclosure, the step 102 may comprise: assuming that it is necessary to configure N types of PUCCH repetition parameters, which are presented by $\{k_1, k_2, \ldots, k_N\}$, wherein $k_i$ ($1 \leq i \leq N$) is an integer, corresponding to a configuration of the number of PUCCH repetitions.

In some specific embodiments of the present disclosure, it is possible to configure four types of PUCCH repetition parameters {1,2,4,8} in advance, which present the number of PUCCH repetitions is 1, 2, 4, or 8 respectively.

In other embodiments of the present disclosure, $k_i$ may present specific number of repetitions, or an offset value of standard number of repetitions of a PUCCH resource in a corresponding PUCCH format configured by the RRC.

In some specific embodiments of the present disclosure, four types of PUCCH repetition parameters {0,−1,1,−2} are configured, which present an offset value of a corresponding number of PUCCH repetitions configured by RRC, wherein 0 presents a value equal to the number configured by the RRC, −1 presents a configurable number of repetitions with one stage lower than the number configured by the RRC, 1 presents a configurable number of repetitions with one stage higher than the number configured by RRC, and so forth. Assume that configurable numbers of PUCCH repetitions in a current protocol are a PUCCH repetition number set of {1,2,4,8}, and the RRC configures the number of repetitions of the PUCCH format 1 to be 4, and configures the number of repetitions of the PUCCH format 3 to be 8. Then, the actual PUCCH repetition numbers configured in this embodiment are: {4,2,8,1} (in a PUCCH format 1) and {8,4,8,2} (in a PUCCH format 3) respectively.

It is to be noted that the number of PUCCH repetitions finally configured will not exceed a range of a configurable number of PUCCH repetitions in a current protocol. For example, in this embodiment, a minimum value of the number of PUCCH repetitions is 1, and a maximum value of the number of PUCCH repetitions is 8.

In Step 11, the base station configures a plurality of PUCCH resources for the UE through radio resource control (RRC) signaling.

In some embodiments of the present disclosure, the step 11 may comprise that: the base station configures several PUCCH resource sets for the UE through the RRC signaling, and configures several PUCCH resources for each resource set and a resource index number of each resource.

In some embodiments of the present disclosure, a PUCCH resource indicator may be configured to indicate a resource index number of each resource.

In some embodiments of the present disclosure, assuming that the "PUCCH resource indicator" occupies M information bits, $2^M$ PUCCH resource index numbers may be indicated.

As shown in Table 1, "PUCCH resource indicator" occupies three information bits, indicating eight PUCCH resource index numbers, and the PUCCH resources corresponding to different indexes and the formats thereof are shown in Table 1.

TABLE 1

| PUCCH resource indicator | PUCCH resource index number | PUCCH format |
|---|---|---|
| 000 | 1 | 1 |
| 001 | 2 | 1 |
| 010 | 3 | 1 |
| 011 | 4 | 3 |

TABLE 1-continued

| PUCCH resource indicator | PUCCH resource index number | PUCCH format |
|---|---|---|
| 100 | 5 | 3 |
| 101 | 6 | 3 |
| 110 | 7 | 3 |
| 111 | 8 | 3 |

In some embodiments of the present disclosure, as shown in Table 1, among eight PUCCH resources, three PUCCH resources use the PUCCH format 1 and five PUCCH resources use the PUCCH format 3.

In other embodiments of the present disclosure, among eight PUCCH resources, two PUCCH resources use the PUCCH format 1, three PUCCH resources use the PUCCH format 3, and three PUCCH resources use the PUCCH format 4.

In some embodiments of the present disclosure, the step 11 may further comprise that: the base station configures standard PUCCH number of repetitions in different PUCCH formats for UE through RRC signaling. For example, a number of repetitions in a PUCCH format 1 is 4, and a number of repetitions in a PUCCH format 3 is 8.

In Step 12, the base station determines a number of repetitions corresponding to each PUCCH resource of the plurality of PUCCH resources by using a predefined rule, that is, a corresponding relationship between an index number of each PUCCH resource and a number of repetitions is determined.

In some embodiments of the present disclosure, the step 12 may comprise steps 121 and 122.

In Step 121, all the PUCCH resources are classified according to the PUCCH formats.

In Step 122, in each classification, a number of repetitions corresponding to each PUCCH resource is determined.

In some embodiments of the present disclosure, in Step 122, the step of determining a number of repetitions corresponding to each PUCCH resource may comprise steps a and b.

In Step a, a repetition parameter corresponding to each PUCCH resource is determined.

In some embodiments of the present disclosure, the step a may comprise steps a1 to a4.

In Step a1, a serial number of each repetition parameter in a repetition parameter set of PUCCH is set.

In Step a2, all the PUCCH resource index numbers in each classification are sorted.

In some embodiments of the present disclosure, assuming that the "PUCCH resource indicator" occupies M information bits, $2^M$ PUCCH resource index numbers may be indicated.

In some embodiments of the present disclosure, the step $a_2$ may comprise that: assume that among the $2^M$ PUCCH resources, $a_1$ PUCCH resources use a PUCCH format 1, with corresponding PUCCH resource index numbers sorted as $\{x_1, x_2, \ldots, x_{a_1}\}$ in an ascending order, and $a_3$ PUCCH resources use a PUCCH format 3, with corresponding PUCCH resource index numbers sorted as $\{y_1, y_2, \ldots y_{a_3}\}$ in an ascending order, $a_4$ PUCCH resources use a PUCCH format 4, with corresponding PUCCH resource index numbers sorted as $\{z_1, z_2, \ldots z_{a_4}\}$ in an ascending order.

In Step a3, a serial number of a repetition parameter corresponding to the serial number of each PUCCH resource index number is determined.

In some embodiments of the present disclosure, the step a3 may comprise: performing a remainder operation on a serial number of each PUCCH resource index number and a sum of elements of a repetition parameter set; determining the serial number of a repetition parameter according to the remainder in the case where the remainder is not zero; and determining the serial number of a repetition parameter according to a sum of elements of the repetition parameter set in the case where the remainder is zero.

In some embodiments of the present disclosure, the step a3 may comprise: assuming that the PUCCH resource indicated by this DCI uses a PUCCH format 1, with a corresponding PUCCH resource index number of $x_1$, where $x_1 \in \{x_1,x_2,\ldots,x_{a_1}\}$, and assuming that $x_1$ is the Pth element in $\{x_1,x_2,\ldots,x_{a_1}\}$. According to the formula (1), it is possible to determine a serial number Q of each repetition parameter $k_Q$ in N repetition parameter sets $\{k_1,k_2,\ldots,k_N\}$.

$$Q = \begin{cases} P \bmod N, & P \bmod N \neq 0 \\ N, & P \bmod N = 0 \end{cases} \quad (1)$$

Wherein, the mod operation is a remainder operation, which is an operation to calculate a remainder of one integer P divided by another integer N in an integer operation, without considering a quotient of the operation.

In Step a4, a repetition parameter of the serial number is taken as a repetition parameter corresponding to the resource index number.

In Step b, a number of repetitions corresponding to each repetition parameter is determined.

In some embodiments of the present disclosure, the step b may comprise that: a number of PUCCH repetitions indicated by this DCI is determined according to a repetition parameter $k_Q$, $k_Q \in \{k_1,k_2,\ldots,k_N\}$.

In some embodiments of the present disclosure, the repetition parameter set is a predefined repetition number set. The step b may comprise: taking each repetition parameter in the repetition parameter set as a number of repetitions.

In other embodiments of the present disclosure, the step b may comprise: configuring a number of repetitions of a PUCCH resource in each PUCCH format; and setting each repetition parameter in the repetition parameter set as an offset value relative to the repetition number of a format of the PUCCH within a predefined repetition number set.

In some specific embodiments of the present disclosure, four types of PUCCH repetition parameters {0,−1,1,−2} are configured, which present an offset value of a corresponding number of PUCCH repetitions configured by RRC, wherein 0 presents a value equal to the number configured by the RRC, −1 presents a configurable number of repetitions with one stage lower than the number configured by the RRC, 1 presents a configurable number of repetitions with one stage higher than the number configured by RRC, and so forth. Assume that configurable numbers of PUCCH repetitions in a current protocol are a PUCCH repetition number set of {1,2,4,8}, and the RRC configures the number of repetitions of the PUCCH format 1 to be 4, and configures the number of repetitions of the PUCCH format 3 to be 8. Then, the actual PUCCH repetition numbers configured in this embodiment are: {4,2,8,1} (in a PUCCH format 1) and {8,4,8,2} (in a PUCCH format 3) respectively.

It is to be noted that the number of PUCCH repetitions finally configured will not exceed a range of a configurable number of PUCCH repetitions in a current protocol. For example, in this embodiment, a minimum value of the number of PUCCH repetitions is 1, and a maximum value of the number of PUCCH repetitions is 8.

In Step 13, the base station determines a current (Dynamic) number of repetitions for PUCCH transmission (Dynamic PUCCH number of repetitions) by the UE.

In some embodiments of the present disclosure, the current number of repetitions refers to a number of repetitions currently determined, which is a number of repetitions for PUCCH transmission by UE in the next stage.

In some embodiments of the present disclosure, the step 13 may comprise that: the base station determines a current number of repetitions for PUCCH transmission by UE according to a channel condition of the user uplink channel. For example, in the case where there is a poor channel condition of the user uplink channel, a current number of repetitions is increased to improve the transmission accuracy; and in the case where there is a favorable channel condition of the user uplink channel, a current number of repetitions is reduced to improve the transmission efficiency.

In Step 14, the base station determines a current resource index number of a resource for PUCCH transmission by UE corresponding to a current number of repetitions according to a correspondence relationship between a PUCCH resource index number and a number of repetitions.

In some embodiments of the present disclosure, the step 14 may comprise that: the base station determines at least one PUCCH resource index number available for PUCCH transmission by UE from a corresponding relationship between a PUCCH resource index number and a number of repetitions determined in Step 12 according to a current number of repetitions of UE; one is selected from the at least one PUCCH resource index number available as a current PUCCH resource index number.

For example, the repetition numbers determined by two PUCCH resources with PUCCH resource index numbers of 2 and 5 in Table 1 are both the second number of repetitions in a PUCCH repetition number set {1,2,4,8}, that is, a number of repetitions is 2. If the current number of repetitions is 2, a PUCCH resource index number of 2 or 5 may be selected as a current resource index number.

In Step 15, the base station sends the current resource index number to the UE through the downlink control information (DCI), to indicate the current number of repetitions, so that UE decodes the received current resource index number and determines the current number of repetitions.

In some embodiments of the present disclosure, the step 15 may comprise: sending a PUCCH resource index number for PUCCH transmission by UE to the UE through an information domain of the PUCCH resource indicator of the downlink control information (DCI) to indicate a PUCCH resource index number for a corresponding PUCCH transmission, and implicitly indicate a number of PUCCH repetitions of the UE, so that the UE first decodes the PUCCH resource indicator to obtain a PUCCH resource index number, and then decodes the received PUCCH resource index number according to a correspondence relationship between a PUCCH resource index number for PUCCH transmission and a number of PUCCH repetitions, to determine a number of PUCCH repetitions and perform a corresponding PUCCH transmission.

For the technical problem that the number of PUCCH repetitions in the related art may only use a RRC signaling semi-persistent configuration, which might waste resources and adversely affect the transmission performance of the PUCCH, if a number of PUCCH repetitions is dynamically indicated by increasing a DCI information domain, it is possible increase the overhead of the DCI and affect the performance of the PDCCH.

Based on the method for indicating a number of repetitions of a physical uplink control channel provided in the above-described embodiments of the present disclosure, it is possible to indicate a number of PUCCH repetitions implicitly and dynamically through the DCI and allow that the base station may dynamically configure the number of PUCCH repetitions without increasing the overhead of the DCI, thereby improving the utilization efficiency and transmission performance of the uplink resource.

The inventors have noticed that for the transmission of HARQ-ACK, the base station will indicate specific PUCCH resources for HARQ-ACK through an information domain of a "PUCCH resource indicator" of DCI, which occupies up to three bits, corresponding to up to eight PUCCH resource indexes, and each PUCCH resource index corresponds to a PUCCH resource configured by the RRC. The inventors have found that this information domain may be used to indicate a number of repetitions of HARQ-ACK implicitly and dynamically, and also expanded to indicate a number of repetitions of other types of UCI implicitly and dynamically.

Figure 2A:
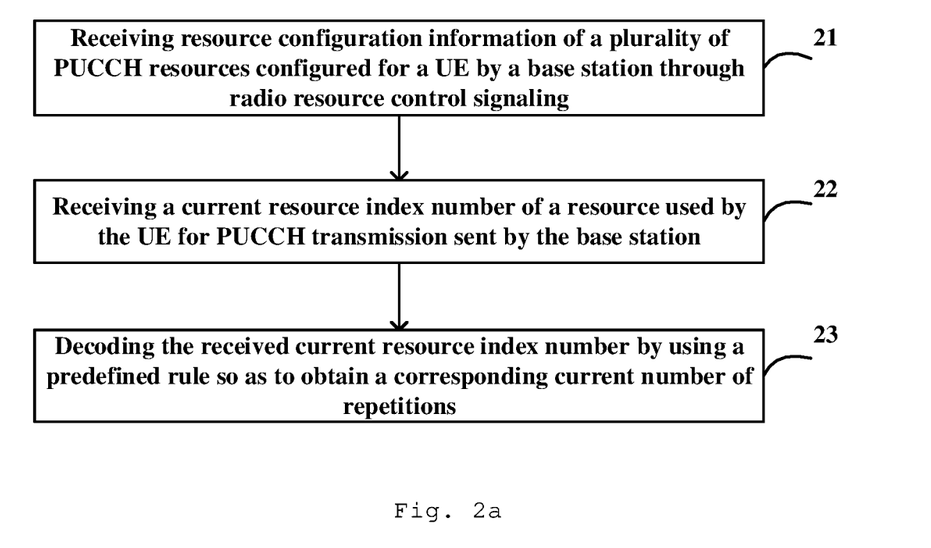
FIG. 2a is a schematic view of a method for obtaining a number of PUCCH repetitions according to some embodiments of the present disclosure.

FIG. 2a is a schematic view of a method for obtaining a number of PUCCH repetitions according to some embodiments of the present disclosure. Preferably, this embodiment may be performed by the UE of the present disclosure. The method may comprise steps 21 to 23.

In Step 21, the UE receives resource configuration information of a plurality of physical uplink control channel (PUCCH) resources configured by the base station for the UE through radio resource control signaling.

In Step 22, the UE receives a current resource index number of a resource used by the UE for PUCCH transmission sent by the base station.

In Step 23, the UE decodes the received current resource index number by using a predefined rule to obtain a corresponding current number of repetitions.

Figure 2B:
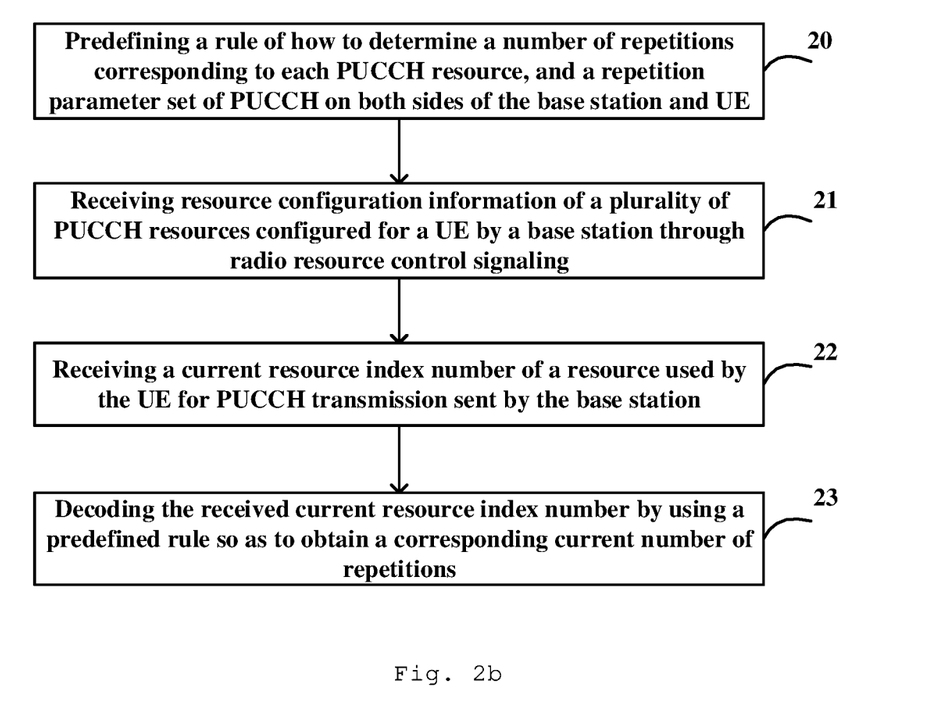
FIG. 2b is a schematic view of a method for obtaining a number of PUCCH repetitions according to other embodiments of the present disclosure.

FIG. 2b is a schematic view of a method for obtaining a number of PUCCH repetitions according to other embodiments of the present disclosure. Preferably, this embodiment may be performed by UE of the present disclosure. The method may comprise steps 20 to 23.

In Step 20, a rule of how to determine a number of repetitions corresponding to each PUCCH resource, and a repetition parameter set of PUCCH are predefined on both sides of the base station and the UE.

In Step 21, the UE receives resource configuration information of a plurality of physical uplink control channel (PUCCH) resources configured by the base station for the UE through radio resource control signaling.

The steps 20 and 21 according to the embodiment of FIG. 2b are the same as or similar to the steps 10 and 11 according to the embodiment of FIG. 1b, and will not be described in detail here.

In Step 22, the UE receives a current resource index number of a resource used by the UE for PUCCH transmission sent by the base station.

In some embodiments of the present disclosure, the step 22 may comprise that: the UE receives an information domain of the "PUCCH resource indicator" of DCI sent by the base station, and decodes an information domain of the "PUCCH resource indicator" of DCI, to obtain a current resource index number of a resource for PUCCH transmission by the UE.

In Step 23, the UE decodes the received current resource index number by using a predefined rule to obtain a corresponding current number of repetitions, to perform corresponding PUCCH transmission.

In some embodiments of the present disclosure, in Step 23, the decoding the received current resource index number by using a predefined rule and obtaining a corresponding current number of repetitions may comprise steps 231 and 232.

In Step 231: a corresponding repetition parameter is determined according to the received current resource index number.

In some embodiments of the present disclosure, the step 231 may comprise steps 2311 to 2314.

In Step 2311, a serial number of the received current resource index number among all the PUCCH resource index numbers in the PUCCH format is determined.

In Step 2312, a serial number of each repetition parameter in a repetition parameter set of the PUCCH is set.

In Step 2313, a serial number of a repetition parameter corresponding to a serial number of a current resource index number is determined.

In some embodiments of the present disclosure, the step 2313 may comprise that: performing a remainder operation on the serial number of a current resource index number and a sum of elements of a repetition parameter set repetition parameter set; determining the serial number of the corresponding repetition parameter according to the remainder in the case where the remainder is not zero; and determining the serial number of the corresponding repetition parameter according to a sum of elements of the repetition parameter set in the case where the remainder is zero.

In Step 2314, a repetition parameter of the serial number is taken as the repetition parameter corresponding to the current resource index number.

In Step 232, a corresponding current number of repetitions is determined according to the determined repetition parameter.

In some embodiments of the present disclosure, the step 232 may comprise: taking the determined repetition parameter as a corresponding current number of repetitions in the case where the repetition parameter set is a predefined repetition number set.

In some embodiments of the present disclosure, the step 232 may comprise: determining a corresponding current number of repetitions according to the determined repetition parameter, a number of repetitions of a PUCCH resource in a PUCCH format and the predefined repetition number set in the case where each repetition parameter in the repetition parameter set is an offset value relative to the repetition number of a format of the PUCCH within a predefined repetition number set.

In some specific embodiments of the present disclosure, the repetition numbers determined by two PUCCH resources with PUCCH resource index numbers of 2 and 5 in Table 1 are both the second number of repetitions in a PUCCH repetition number set {1,2,4,8}, that is, a number of repetitions is 2; if the current number of repetitions is 2, and the PUCCH resource index number is 5, the PUCCH resource indicator will be 100; then the PUCCH resource indicator received by UE is 100, and UE decodes 100 to obtain the current PUCCH resource index number as 5; the current resource index number is 5, and a serial number in a PUCCH format 3 in Table 1 is 2; a remainder operation is performed on 2 and a sum of elements of {1,2,4,8}, to obtain a current number of repetitions of 2.

Based on the method for obtaining a number of repetitions of a physical uplink control channel provided in the above-described embodiments of the present disclosure, it is possible to implicitly and dynamically indicate a number of PUCCH repetitions through DCI, and receive a number of PUCCH repetitions dynamically configured by the base station for UE without increasing the overhead of DCI, thereby improving the utilization efficiency and transmission performance of the uplink resource.

The method for indicating and obtaining a number of repetitions of a physical uplink control channel of the present disclosure will be explained below through specific embodiments.

Embodiment 1

1. In this embodiment, the "PUCCH resource indicator" occupies three information bits, and indicate eight PUCCH resource indexes, and the PUCCH resources corresponding to different indexes and the formats thereof are shown in Table 1.

2. In this embodiment, four types of PUCCH repetition parameters {1,2,4,8} are configured, which presents that a number of PUCCH repetitions is 1, 2, 4 or 8 respectively.

3. As may be seen from Table 1, three PUCCH resources use the PUCCH format 1, with corresponding PUCCH resource index numbers sorted as {1,2,3} in an ascending order, and five PUCCH resources use the PUCCH format 3, with corresponding PUCCH resource index numbers sorted as {4,5,6,7,8} in an ascending order.

4. If the value of the "PUCCH resource indicator" information domain of this DCI is 010, the corresponding PUCCH resource uses a PUCCH format 1, the corresponding PUCCH resource index is 3, which is the third element in the {1,2,3} set. Since 3 mod 4=3, the number of PUCCH repetitions indicated by this DCI is determined by a third value of {1,2,4,8}, i.e., the number of repetitions is 4.

If the value of the "PUCCH resource indicator" information domain of this DCI is 111, the corresponding PUCCH resource uses a PUCCH format 3, and the corresponding PUCCH resource index is 8, which is the fifth element in the {4,5,6,7,8} set. Since 5 mod 4=1, the number of PUCCH repetitions indicated by this DCI is determined by a first value of {1,2,4,8}, i.e., the number of repetitions is 1.

Embodiment 2

1. In this embodiment, the "PUCCH resource indicator" occupies three information bits, and indicates eight PUCCH resource indexes, and the PUCCH resources corresponding to different indexes and the formats thereof are shown in Table 1.

2. In this embodiment, four types of PUCCH repetition parameters {0,−1,1,−2} are configured, which present an offset value of a corresponding number of PUCCH repetitions configured by RRC, wherein 0 presents a value equal to the number configured by the RRC, −1 presents a configurable number of repetitions with one stage lower than the number configured by the RRC, 1 presents a configurable number of repetitions with one stage higher than the number configured by RRC, and so forth. Assume that configurable numbers of PUCCH repetitions in a current protocol are a PUCCH repetition number set of {1,2,4,8}, and the RRC configures the number of repetitions of the PUCCH format 1 to be 4, and configures the number of repetitions of the PUCCH format 3 to be 8. Then, the actual PUCCH repetition numbers configured in this embodiment are: {4,2,8,1} (in a PUCCH format 1) and {8,4,8,2} (in a PUCCH format 3) respectively.

It is to be noted that the number of PUCCH repetitions finally configured will not exceed a range of a configurable number of PUCCH repetitions in a current protocol. For example, in this embodiment, a minimum value of the number of PUCCH repetitions is 1, and a maximum value of the number of PUCCH repetitions is 8.

3. The subsequent process of this embodiment is the same as that of Embodiment 1, and thus will not be described in detail here.

Figure 3:
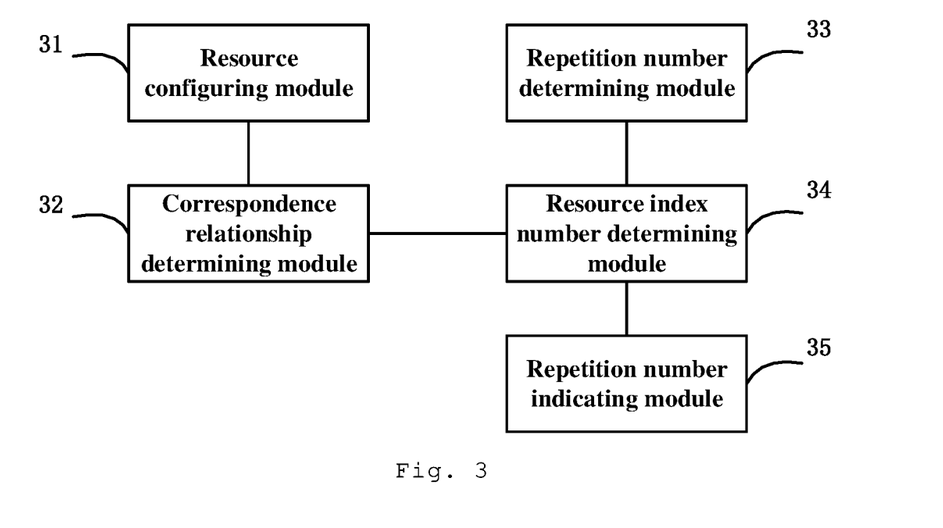
FIG. 3 is a schematic view of a base station according to some embodiments of the present disclosure.

FIG. 3 is a schematic view of a base station according to some embodiments of the present disclosure. As shown in FIG. 3, the base station of the present disclosure may comprise a resource configuring module 31, a correspondence relationship determining module 32, a repetition number determining module 33, a resource index number determining module 34 and a repetition number indicating module 35.

The resource configuring module 31 is configured to configure a plurality of physical uplink control channel (PUCCH) resources for a user equipment (UE) through radio resource control signaling.

The correspondence relationship determining module 32 is configured to determine a number of repetitions corresponding to each PUCCH resource of the plurality of PUCCH resources by using a predefined rule.

In some embodiments of the present disclosure, the correspondence relationship determining module 32 may be configured to classify all the PUCCH resources according to PUCCH formats; and to determine the number of repetitions corresponding to each PUCCH resource in each classification.

In some embodiments of the present disclosure, the correspondence relationship determining module 32 may be configured to determine a repetition parameter corresponding to each PUCCH resource; and determine the number of repetitions corresponding to each repetition parameter, in the case where a number of repetitions corresponding to each PUCCH resource is determined.

In some embodiments of the present disclosure, the correspondence relationship determining module 32 may be configured to set a serial number of each repetition parameter in a repetition parameter set of a PUCCH; sort all the PUCCH resource index numbers in each classification; determine a serial number of a repetition parameter corresponding to a serial number of each PUCCH resource index number; and take the repetition parameter of the serial number as a repetition parameter corresponding to the resource index number, in the case where a repetition parameter corresponding to each PUCCH resource is determined.

In some embodiments of the present disclosure, the correspondence relationship determining module 32 may be configured to perform a remainder operation on the serial number of each PUCCH resource index number and a sum of elements of a repetition parameter set; determine the serial number of the repetition parameter according to the remainder in the case where the remainder is not zero; and determine the serial number of the repetition parameter according to the sum of the elements of the repetition parameter set in the case where the remainder is zero, in the case where a serial number of a repetition parameter corresponding to a serial number of each PUCCH resource index number is determined.

In some embodiments of the present disclosure, the repetition parameter set is a predefined repetition number set; and the correspondence relationship determining module 32 may be configured to take each repetition parameter in the repetition parameter set as the number of repetitions, in the case where a number of repetitions is determined corresponding to each repetition parameter.

In some embodiments of the present disclosure, the correspondence relationship determining module 32 may be configured to configure the number of repetitions of a PUCCH resource in each PUCCH format; and set each repetition parameter in the repetition parameter set as an offset value relative to the repetition number of a format of the PUCCH within a predefined repetition number set.

The repetition number determining module 33 is configured to determine a current number of repetitions of a PUCCH transmission by the UE.

The resource index number determining module 34 is configured to determine a current resource index number of a resource for the PUCCH transmission by the UE corresponding to the current number of repetitions.

The repetition number indicating module 35 is configured to send the current resource index number to the UE, to indicate the current number of repetitions, so that UE decodes the received current resource index number and determines the current number of repetitions.

In some embodiments of the present disclosure, the repetition number indicating module 35 may be configured to send a PUCCH resource index number for PUCCH transmission by UE to the UE through an information domain of the PUCCH resource indicator of the downlink control information (DCI) to indicate a PUCCH resource index number for a corresponding PUCCH transmission, and implicitly indicate a number of PUCCH repetitions of the UE, so that the UE first decodes the PUCCH resource indicator to obtain a PUCCH resource index number, and then decodes the received PUCCH resource index number according to a correspondence relationship between a PUCCH resource index number for PUCCH transmission and a number of PUCCH repetitions, to determine a number of PUCCH repetitions and perform a corresponding PUCCH transmission.

In some embodiments of the present disclosure, the base station may be configured to predefine a rule of how to correspond to a repeat factor according to each PUCCH resource, and a repetition parameter set of PUCCH.

In some embodiments of the present disclosure, the base station may be configured to perform operations to implement the method for indicating a number of repetitions of a physical uplink control channel according to any of the above-described embodiments (for example, the embodiment of FIG. 1a or 1b).

For the technical problem that the number of PUCCH repetitions in the related art may only use a RRC signaling semi-persistent configuration, which might waste resources and adversely affect the transmission performance of PUCCH, if a number of PUCCH repetitions is dynamically indicated by increasing a DCI information domain, it is possible increase the overhead of DCI and affect the performance of the PDCCH.

Based on the base station provided in the above-described embodiments of the present disclosure, it is possible to indicate a number of PUCCH repetitions implicitly and dynamically through the DCI and allow that the base station may dynamically configure the number of PUCCH repetitions without increasing the overhead of the DCI, thereby improving the utilization efficiency and transmission performance of the uplink resource.

Figure 4:
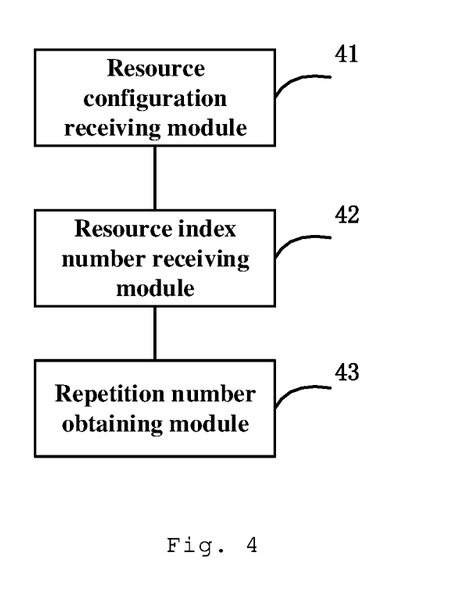
FIG. 4 is a schematic view of a user equipment according to some embodiments of the present disclosure.

FIG. 4 is a schematic view of a UE according to some embodiments of the present disclosure. As shown in FIG. 4, UE of the present disclosure may comprise a resource configuration receiving module 41, a resource index number receiving module 42 and a repetition number obtaining module 43.

The resource configuration receiving module 41 is configured to receive resource configuration information of a plurality of physical uplink control channel (PUCCH) resources configured for a user equipment (UE) by a base station through radio resource control signaling.

The resource index number receiving module 42 is configured to receive a current resource index number of a resource used by the UE for PUCCH transmission sent by the base station.

The repetition number obtaining module 43 is configured to decode the received current resource index number by using a predefined rule to obtain a corresponding current number of repetitions.

In some embodiments of the present disclosure, the repetition number obtaining module 43 may be configured to determine a corresponding repetition parameter according to the received current resource index number; and determine a corresponding current number of repetitions according to the determined repetition parameter.

In some embodiments of the present disclosure, the number of repetitions obtaining module 43 may be configured to determine a serial number of the received current resource index number among all the PUCCH resource index numbers in the PUCCH format; determine a serial number of a repetition parameter corresponding to a serial number of the current resource index number; and take a repetition parameter of the serial number as the repetition parameter corresponding to the current resource index number, in the case where a corresponding repetition parameter is determined according to the received current resource index number; set a serial number of each repetition parameter in a repetition parameter set of PUCCH.

In some embodiments of the present disclosure, the number of repetitions obtaining module 43 may be configured to perform a remainder operation on the serial number of a current resource index number and a sum of elements of a repetition parameter set repetition parameter set; determine the serial number of the corresponding repetition parameter according to the remainder in the case where the remainder is not zero; and determine the serial number of the corresponding repetition parameter according to a sum of elements of the repetition parameter set in the case where the remainder is zero, in the case where a serial number of a repetition parameters corresponding to a serial number of a current resource index number is determined.

In some embodiments of the present disclosure, the number of repetitions obtaining module 43 may be configured to take the determined repetition parameter as the corresponding current number of repetitions in the case where the repetition parameter set is a predefined number of repetitions set, in the case where a corresponding current number of repetitions is determined according to the determined repetition parameter.

In other embodiments of the present disclosure, the number of repetitions obtaining module 43 may be configured to determine a corresponding current number of repetitions according to the determined repetition parameter, a number of repetitions of a PUCCH resource in a PUCCH format and the predefined repetition number set in the case where each repetition parameter in the repetition parameter set is an offset value relative to the repetition number of a format of the PUCCH within a predefined repetition number set, in the case where a corresponding current number of repetitions according to the determined repetition parameter.

In some embodiments of the present disclosure, the UE may be configured to perform operations to implement the method for obtaining a number of repetitions of a physical uplink control channel according to any of the above-described embodiments (for example, the embodiment of FIG. 2a or the embodiment of FIG. 2b).

Based on UE provided by the above-described embodiments of the present disclosure, it is possible to implicitly and dynamically indicate a number of PUCCH repetitions through DCI, and receive a number of PUCCH repetitions dynamically configured by the base station for UE without increasing the overhead of DCI, thereby improving the utilization efficiency and transmission performance of the uplink resource.

Figure 5:
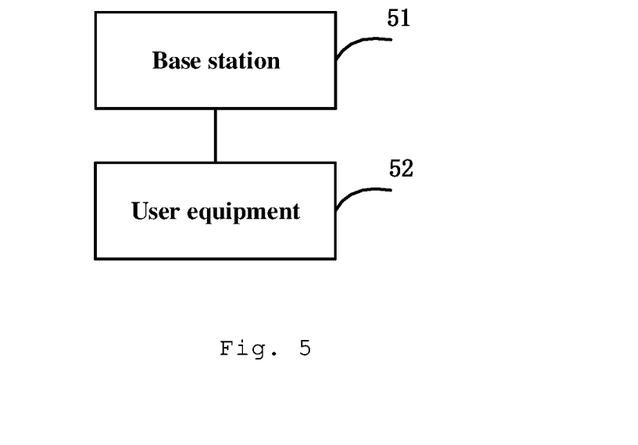
FIG. 5 is a schematic view of a system for indicating a number of PUCCH repetitions according to some embodiments of the present disclosure.

FIG. 5 is a schematic view of a system for indicating a number of PUCCH repetitions according to some embodiments of the present disclosure. As shown in FIG. 5, the system for indicating a number of repetitions of a physical uplink control channel of the present disclosure may comprise a base station 51 and UE 52.

The base station 51 may be the base station according to any of the above-described embodiments (for example, the embodiment of FIG. 3).

The UE 52 may be UE according to any of the above-described embodiments (for example, the embodiment of FIG. 4).

Figure 6:
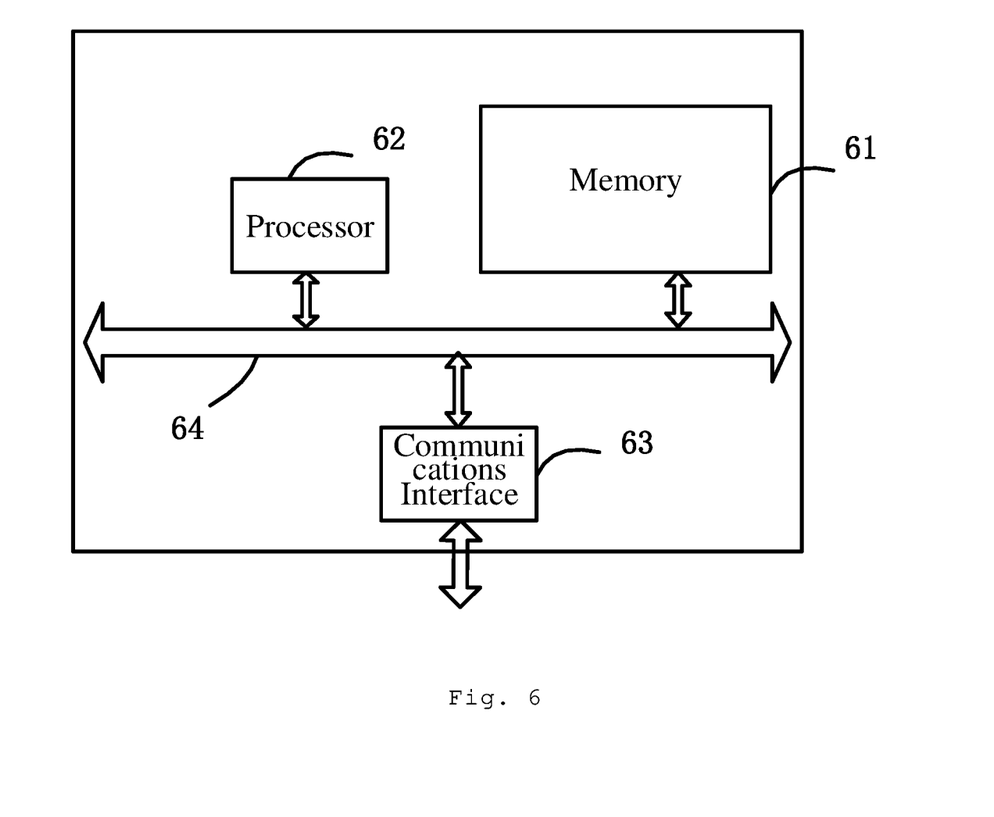
FIG. 6 is a structural schematic view of a computer device according to some embodiments of the present disclosure.

Based on the system for indicating a number of repetitions of a physical uplink control channel provided by the above-described embodiments of the present disclosure, it is possible to indicate a number of PUCCH repetitions implicitly and dynamically through DCI. In the above-described embodiments of the present disclosure, it is possible to allow that the base station may dynamically configure a number of PUCCH repetitions without increasing the overhead of DCI, thereby improving the utilization efficiency and transmission performance of the uplink resource. FIG. 6 is a structural schematic view of a computer device according to some embodiments of the present disclosure. As shown in FIG. 6, the computer device may comprise a memory 61 and a processor 62.

The memory 61 is configured to store instructions, the processor 62 is coupled to the memory 61, and the processor 62 is configured to execute the instructions stored in the memory to implement a method for indicating a number of repetitions of a physical uplink control channel according to any of the above-described embodiments (for example, the embodiment of FIG. 1a or 1b) or a method for obtaining a number of repetitions of a physical uplink control channel according to any of the above-described embodiments (for example, the embodiment of FIG. 2a or 2b).

The computer device may be implemented as a base station in the case where the processor 62 implements a method for indicating a number of repetitions of a physical uplink control channel according to any of the above-described embodiments (for example, the embodiment of FIG. 1a or 1b).

The computer device may be implemented as UE in the case that the processor 62 implements a method for obtaining a number of repetitions of a physical uplink control channel according to any of the above-described embodiments (for example, the embodiment of FIG. 2a or 2b).

As shown in FIG. 6, the computer device also comprises a communication interface 63 for information interaction with other devices. At the same time, the computer device also comprises a bus 64 through which the processor 62, the communication interface 63 and the memory 61 communicate with each other.

The memory 61 may contain a high-speed RAM memory or a non-volatile memory, for example at least one disk memory. The memory 61 may also be a memory array. The memory 61 might also be partitioned, and the blocks may be combined into a virtual volume according to certain rules.

Further, the processor 62 may be a central processing unit (CPU), or may be an application specific integrated circuit (ASIC), or one or more integrated circuits configured to implement the embodiments of the present disclosure.

Based on the computer device provided by the above-described embodiments of the present disclosure, it is possible to indicate a number of PUCCH repetitions implicitly and dynamically through DCI. In the above-described embodiments of the present disclosure, it is possible to allow that the base station may dynamically configure a number of PUCCH repetitions without increasing the overhead of DCI, thereby improving the utilization efficiency and transmission performance of the uplink resource.

According to another aspect of the present disclosure, a non-transitory computer-readable storage medium is provided, wherein the non-transitory computer-readable storage medium stores computer instructions that, when executed by a processor, implement a method for indicating a number of PUCCH repetitions according to any of the above-described embodiments (for example, the embodiment of FIG. 1a or 1b) or a method for obtaining a number of PUCCH repetitions according to any of the above-described embodiments (for example, the embodiment of FIG. 2a or 2b).

Based on the non-transitory computer-readable storage medium provided by the above-described embodiments of the present disclosure, it is possible to indicate a number of PUCCH repetitions implicitly and dynamically through DCI. In the above-described embodiments of the present disclosure, it is possible to allow that the base station may dynamically configure a number of PUCCH repetitions without increasing the overhead of DCI, thereby improving the utilization efficiency and transmission performance of the uplink resource.

The above-described embodiments of the present disclosure may be applied to the field of wireless communication technology, in particular to the field of 5G.

The base station and UE described above may be implemented as a general processor, a programmable logic controller (PLC), a digital signal processor (DSP), an application specific integrated circuit (ASIC), a field programmable gate array (FPGA) or other programmable logic devices, discrete gate or transistor logic devices, discrete hardware components or any suitable combination thereof for performing the functions described in this application.

Hitherto, the present disclosure has been described in detail. Some details well known in the art are not described in order to avoid obscuring the concept of the present disclosure. According to the above description, those skilled in the art would fully understand how to implement the technical solutions disclosed here.

Those of ordinary skill in the art may understand that all or some of the steps in the above-described embodiments may be accomplished by hardware, or by programs to instruct relevant hardware. The programs may be stored in a non-transitory computer-readable storage medium. The storage medium as mentioned above may be read-only memory, magnetic disk or optical disk, and the like.

Descriptions of the present disclosure, which are made for purpose of exemplification and description, are not absent with omissions or limit the present disclosure to the forms as disclosed. Many modifications and variations are apparent for those skilled in the art. The embodiments are selected and described in order to better explain the principles and actual application of the present disclosure, and enable those skilled in the art to understand the present disclosure to design various embodiments adapted to particular purposes and comprising various modifications.

What is claimed is:

1. A method for indicating a number of PUCCH repetitions, comprising:
configuring a plurality of physical uplink control channel (PUCCH) resources for a user equipment (UE) through radio resource control signaling;
determining a number of repetitions corresponding to each PUCCH resource of the plurality of PUCCH resources by using a predefined rule;
determining a current number of repetitions of a PUCCH transmission by the UE;
determining a current resource index number of a resource for the PUCCH transmission by the UE corresponding to the current number of repetitions; and
sending the current resource index number to the UE, to indicate the current number of repetitions, so that UE decodes the received current resource index number and determines the current number of repetitions;
wherein the determining a number of repetitions corresponding to each PUCCH resource of the plurality of PUCCH resources by using a predefined rule comprises:
classifying all the PUCCH resources according to PUCCH formats to obtain one or more classifications; and
determining the number of repetitions corresponding to each PUCCH resource in each of the classifications;
wherein the determining a number of repetitions corresponding to each PUCCH resource comprises:
determining a repetition parameter corresponding to each PUCCH resource; and
determining a number of repetitions corresponding to each repetition parameter;
wherein the determining a repetition parameter corresponding to each PUCCH resource comprises:
setting a first serial number of each repetition parameter in a repetition parameter set of a PUCCH;
sorting all PUCCH resource index numbers in each of the classifications, to obtain a second serial number of each PUCCH resource index number;
determining a first serial number of a repetition parameter corresponding to the second serial number of the each PUCCH resource index number; and
taking the repetition parameter of the first serial number corresponding to the second serial number as a repetition parameter corresponding to the each PUCCH resource index number.

2. The method for indicating a number of PUCCH repetitions according to claim 1, wherein the sending the current resource index number to UE comprises:
sending the current resource index number to UE through a PUCCH resource indicator of downlink control information.

3. The method for indicating a number of PUCCH repetitions according to claim 1, wherein the determining a first serial number of a repetition parameter corresponding to the second serial number of the each PUCCH resource index number comprises:
performing a remainder operation on the second serial number of the each PUCCH resource index number and a sum of elements of a repetition parameter set;
determining the first serial number of the repetition parameter according to the remainder in a case where the remainder is not zero; and
determining the first serial number of the repetition parameter according to the sum of the elements of the repetition parameter set in a case where the remainder is zero.

4. The method for indicating a number of PUCCH repetitions according to claim 1, wherein:
the repetition parameter set is a predefined repetition number set; and
the determining the number of repetitions corresponding to each repetition parameter comprises taking each repetition parameter in the repetition parameter set as the number of repetitions.

5. The method for indicating a number of PUCCH repetitions according to claim 1, wherein the determining a number of repetitions corresponding to each repetition parameter comprises:
configuring the number of repetitions of a PUCCH resource in each PUCCH format; and
setting each repetition parameter in the repetition parameter set as an offset value relative to the repetition number of a format of the PUCCH within a predefined repetition number set.

6. A method for obtaining a number of PUCCH repetitions, comprising:
receiving resource configuration information of a plurality of physical uplink control channel (PUCCH) resources configured for a user equipment (UE) by a base station through radio resource control signaling;
receiving a current resource index number of a resource used by the UE for PUCCH transmission sent by the base station; and
decoding the received current resource index number by using a predefined rule to obtain a corresponding current number of repetitions;
wherein the decoding the received current resource index number by using a predefined rule to obtain a corresponding current number of repetitions comprises:
determining a corresponding repetition parameter according to the received current resource index number; and
determining a corresponding current number of repetitions according to the determined repetition parameter;
wherein the determining a corresponding repetition parameter according to the received current resource index number comprises:
determining a second serial number of the received current resource index number among all the PUCCH resource index numbers in a PUCCH format;
setting a first serial number of each repetition parameter in a repetition parameter set of PUCCH;
determining a first serial number of a repetition parameter corresponding to the second serial number of the current resource index number; and
taking the repetition parameter of the first serial number corresponding to the second serial number of the current resource index number as the repetition parameter corresponding to the current resource index number.

7. The method for obtaining a number of PUCCH repetitions according to claim 6, wherein the determining a first serial number of a repetition parameter corresponding to the second serial number of the current resource index number comprises:
performing a remainder operation on the second serial number of a current resource index number and a sum of elements of a repetition parameter set repetition parameter set;

determining the first serial number of the corresponding repetition parameter according to the remainder in a case where the remainder is not zero; and determining the first serial number of the corresponding repetition parameter according to a sum of elements of the repetition parameter set in a case where the remainder is zero.

8. The method for obtaining a number of PUCCH repetitions according to claim 6, wherein the determining a corresponding current number of repetitions according to the determined repetition parameter comprises:

taking the determined repetition parameter as a corresponding current number of repetitions in a case where the repetition parameter set is a predefined repetition number set.

9. The method for obtaining a number of PUCCH repetitions according to claim 6, wherein the determining a corresponding current number of repetitions according to the determined repetition parameter comprises:

determining a corresponding current number of repetitions according to the determined repetition parameter, a number of repetitions of a PUCCH resource in a PUCCH format and the predefined repetition number set in a case where each repetition parameter in the repetition parameter set is an offset value relative to the repetition number of a format of the PUCCH within a predefined repetition number set.

10. A base station, comprising:

a resource configuring module configured to configure a plurality of physical uplink control channel (PUCCH) resources for a user equipment (UE) through radio resource control signaling;

a correspondence relationship determining module configured to determine a number of repetitions corresponding to each PUCCH resource of the plurality of PUCCH resources by using a predefined rule;

a repetition number determining module configured to determine a current number of repetitions of a PUCCH transmission by the UE;

a resource index number determining module configured to determine a current resource index number of a resource for the PUCCH transmission by the UE corresponding to the current number of repetitions; and a repetition number indicating module configured to send the current resource index number to the UE, to indicate the current number of repetitions, so that UE decodes the received current resource index number and determines the current number of repetitions, wherein the base station is configured to perform operations for implementing the method for indicating a number of PUCCH repetitions according to claim 1.

11. A user equipment, comprising:

a resource configuration receiving module configured to receive resource configuration information of a plurality of physical uplink control channel (PUCCH) resources configured for a user equipment (UE) by a base station through radio resource control signaling;

a resource index number receiving module configured to receive a current resource index number of a resource used by the UE for PUCCH transmission sent by the base station; and a repetition number obtaining module configured to decode the received current resource index number by using a predefined rule to obtain a corresponding current number of repetitions, wherein the UE is configured to perform operations to implement the method for obtaining a number of PUCCH repetitions according to claim 6.

12. A system for indicating a number of PUCCH repetitions, comprising a base station according to claim 10 and a user equipment comprising:

a resource configuration receiving module configured to receive resource configuration information of a plurality of physical uplink control channel (PUCCH) resources configured for a user equipment (UE) by a base station through radio resource control signaling;

a resource index number receiving module configured to receive a current resource index number of a resource used by the UE for PUCCH transmission sent by the base station; and a repetition number obtaining module configured to decode the received current resource index number by using a predefined rule to obtain a corresponding current number of repetitions, wherein the UE is configured to perform operations to implement the method for obtaining a number of PUCCH repetitions according to claim 6.

13. A computer device, comprising:

a memory configured to store instructions; and a processor coupled to the memory, which is configured to execute the method for performing instructions comprising:

configuring a plurality of physical uplink control channel (PUCCH) resources for a user equipment (UE) through radio resource control signaling;

determining a number of repetitions corresponding to each PUCCH resource of the plurality of PUCCH resources by using a predefined rule;

determining a current number of repetitions of a PUCCH transmission by the UE;

determining a current resource index number of a resource for the PUCCH transmission by the UE corresponding to the current number of repetitions; and sending the current resource index number to the UE, to indicate the current number of repetitions, so that UE decodes the received current resource index number and determines the current number of repetitions;

wherein the determining a number of repetitions corresponding to each PUCCH resource of the plurality of PUCCH resources by using a predefined rule comprises:

classifying all the PUCCH resources according to PUCCH formats to obtain one or more classifications; and determining the number of repetitions corresponding to each PUCCH resource in each of the classifications;

wherein the determining a number of repetitions corresponding to each PUCCH resource comprises:

determining a repetition parameter corresponding to each PUCCH resource; and determining a number of repetitions corresponding to each repetition parameter;

wherein the determining a repetition parameter corresponding to each PUCCH resource comprises:

setting a first serial number of each repetition parameter in a repetition parameter set of a PUCCH;

sorting all PUCCH resource index numbers in each of the classifications, to obtain a second serial number of each PUCCH resource index number;

determining a first serial number of a repetition parameter corresponding to the second serial number of the each PUCCH resource index number; and taking the repetition parameter of the first serial number corresponding to the second serial number as a repetition parameter corresponding to the each PUCCH resource index number.

14. The computer device according to claim 13, wherein: the sending the current resource index number to UE comprises: sending the current resource index number to UE through a PUCCH resource indicator of downlink control information a memory configured to store instructions.

15. A non-transitory computer-readable storage medium, wherein the non-transitory computer-readable storage medium stores computer instructions that, when executed by a processor, implement the method for indicating a number of PUCCH repetitions according to claim 1.

16. A computer device, comprising:
a memory configured to store instructions; and
a processor coupled to the memory, which is configured to execute the method for obtaining a number of PUCCH repetitions according to claim 6.

17. A computer device, comprising:
a memory configured to store instructions; and
a processor coupled to the memory, which is configured to execute the method for obtaining a number of PUCCH repetitions according to claim 7.

18. A non-transitory computer-readable storage medium, wherein the non-transitory computer-readable storage medium stores computer instructions that, when executed by a processor, implement the method for indicating a number of PUCCH repetitions according to claim 2.

19. A non-transitory computer-readable storage medium, wherein the non-transitory computer-readable storage medium stores computer instructions that, when executed by a processor, implement the method for obtaining a number of PUCCH repetitions according to claim 6.

20. A non-transitory computer-readable storage medium, wherein the non-transitory computer-readable storage medium stores computer instructions that, when executed by a processor, implement the method for obtaining a number of PUCCH repetitions according to claim 7.

* * * * *